United States Patent
Timashev et al.

(10) Patent No.: US 11,303,668 B2
(45) Date of Patent: Apr. 12, 2022

(54) SECURE RESTORE

(71) Applicant: Veeam Software AG, Baar (CH)

(72) Inventors: Ratmir Timashev, Baar (CH); Anton Gostev, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 164 days.

(21) Appl. No.: 16/585,819

(22) Filed: Sep. 27, 2019

(65) Prior Publication Data

US 2021/0099465 A1    Apr. 1, 2021

(51) Int. Cl.
*G06F 11/14* (2006.01)
*H04L 29/06* (2006.01)

(52) U.S. Cl.
CPC ........ *H04L 63/145* (2013.01); *G06F 11/1464* (2013.01); *G06F 11/1469* (2013.01); *G06F 2201/84* (2013.01)

(58) Field of Classification Search
CPC ... G06F 11/14; G06F 11/1469; G06F 11/1464
See application file for complete search history.

(56) References Cited

U.S. PATENT DOCUMENTS

| | | | |
|---|---|---|---|
| 6,772,345 B1* | 8/2004 | Shetty .................... | G06F 21/562 713/151 |
| 7,065,790 B1* | 6/2006 | Gryaznov ............. | G06F 21/562 713/188 |
| 7,971,254 B1* | 6/2011 | Ji .......................... | G06F 21/563 726/24 |
| 8,302,192 B1 | 10/2012 | Cnudde et al. | |
| 8,528,091 B2* | 9/2013 | Bowen ................ | H04L 63/1441 726/24 |
| 8,769,684 B2* | 7/2014 | Stolfo ................. | H04L 63/1491 726/23 |
| 2005/0086499 A1* | 4/2005 | Hoefelmeyer ........ | G06F 21/567 713/188 |
| 2006/0265761 A1* | 11/2006 | Rochette ................ | G06F 21/53 726/27 |
| 2007/0168707 A1* | 7/2007 | Kern .................... | G06F 11/1471 714/6.12 |
| 2007/0209076 A1* | 9/2007 | Porter ..................... | G06F 21/52 726/25 |

(Continued)

OTHER PUBLICATIONS

International Search Report and Written Opinion of the International Searching Authority directed to related International Patent Application No. PCT/IB2020/058276, dated Nov. 12, 2020; 10 pages.

*Primary Examiner* — Kamini B Patel

(74) *Attorney, Agent, or Firm* — Sterne, Kessler, Goldstein & Fox P.L.L.C.

(57) ABSTRACT

Disclosed herein are system, method, and computer program product embodiments for restoring an electronic device. An embodiment operates by receiving a request for restoring a portion of data from a point of time onto the electronic device. Thereafter, the portion of data is scanned for a virus. Based on the detection of the virus, a determination is made on whether to proceed with restoring the electronic device with the portion of data. If the determination is made to proceed with the restoring of the electronic device, the portion of data is subsequently transmitted to the electronic device. The portion of data is stored in a backup repository remote from the electronic device.

20 Claims, 6 Drawing Sheets

(56) References Cited

U.S. PATENT DOCUMENTS

| | | | |
|---|---|---|---|
| 2009/0013409 A1* | 1/2009 | Wenzinger | G06F 8/60 |
| | | | 726/24 |
| 2009/0044277 A1* | 2/2009 | Aaron | H04L 63/1433 |
| | | | 726/25 |
| 2011/0078497 A1* | 3/2011 | Lyne | G06F 11/1469 |
| | | | 714/15 |
| 2011/0314542 A1* | 12/2011 | Viswanathan | G06F 21/554 |
| | | | 726/23 |
| 2012/0072989 A1 | 3/2012 | Sakai et al. | |
| 2013/0185800 A1 | 7/2013 | Miller et al. | |
| 2014/0006357 A1* | 1/2014 | Davis | G06F 16/182 |
| | | | 707/667 |
| 2015/0020203 A1* | 1/2015 | Xie | G06F 21/56 |
| | | | 726/24 |
| 2015/0172304 A1* | 6/2015 | Kleczynski | H04L 63/1416 |
| | | | 726/23 |
| 2015/0213286 A1* | 7/2015 | Summers | G06F 21/57 |
| | | | 726/26 |
| 2016/0188229 A1* | 6/2016 | Rabinovich | G06F 11/1453 |
| | | | 711/114 |
| 2016/0269427 A1* | 9/2016 | Haugsnes | G06F 9/45558 |

\* cited by examiner

SECURE RESTORE

BACKGROUND

Servers containing data files shared with end users may be infected with various computer viruses in any number of ways. For example, end users at local computing devices may store data containing viruses onto the servers. Along these lines, viruses may access servers via the end users' local computing devices. End users may seek to restore their computing devices with data stored on the servers unknowing that the data is infected with a virus. Thus, with antivirus software typically utilized at end users' local computing devices, computer viruses may not be identified until the infected data has been stored in the end users' local computing devices.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for securely and safely restoring a user device with data from a point in time. In some embodiments, a central server managed by a third party entity may receive a request from a user device to receive the data. The central server may then coordinate with a specific entity's mount server, which is in communication with the specific entity's backup repositories storing the data, to send the data to the user device. The mount server may then retrieve the data from the backup repositories and determine if the data contains computer viruses. If the data is not infected, the mount server may forward the data to the electronic device. However, if the data is infected, the mount server may determine an appropriate action to take depending on the mount server's configuration. For example, the mount server may first attempt to remove or resolve the computer viruses. Thereafter, the mount server may disconnect or disable itself or the user device from the network and send the data to the electronic device. Alternatively, the mount server may send the data to a different network or security group.

Figure 1:
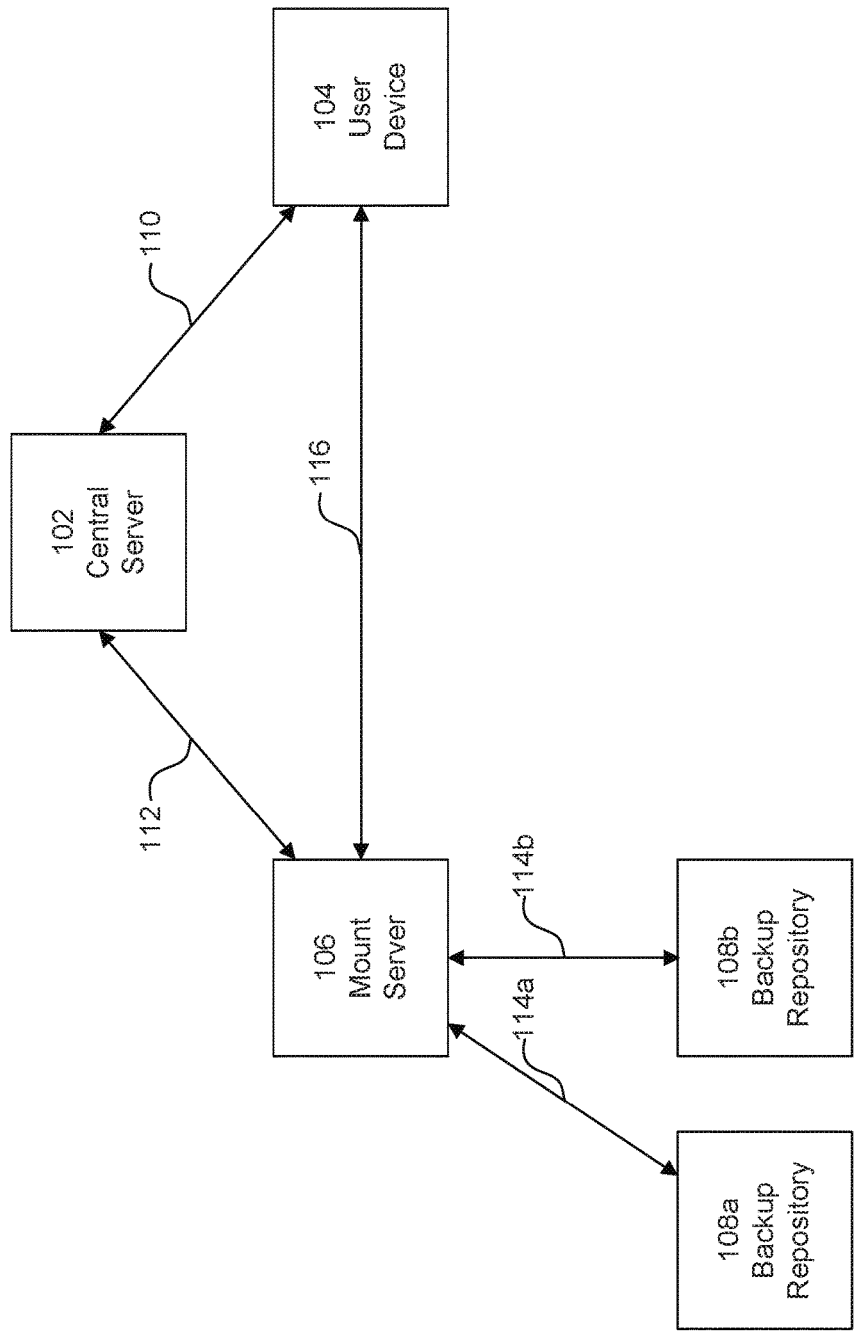
FIG. 1 is a block diagram of a system for restoring data onto an electronic device, according to some embodiments.

FIG. 1 illustrates a block diagram of a system 100 for restoring data onto an electronic device. The system 100 may comprise a central server 102, one or more user devices 104, a mount server 106, and one or more backup repositories 108. A single central server 102 may manage communications for restoring data between the user devices 104 and the mount server 106. The user devices 104 may be any type of electronic device capable of storing combinations or subcombinations of data (e.g., data stored on backup repositories 108 or local data). Example user devices 104 include a computer, a desktop, a laptop, a cellular phone, a palm-top, a personal digital assistant, a server, and a mobile device, to name just some examples. The mount server 106 may permit access to files containing volumes of various portions of data. As such, the backup repositories 108 may store the files. Along these lines, the backup repositories 108 may be separate from the mount server 106. Alternatively, the backup repositories 108 may be stored on the mount server 106. The user devices 104, mount server 106, and backup repositories 108 may be physical or virtual computer. A virtual computer may include a virtual server, a virtual machine, a virtual environment, and/or a virtual infrastructure.

The system 100 may also include firewalls (not illustrated) protecting access to the mount server 106 and/or backup repositories 108. For example, if the mount server 106 contain the backup repositories 108, the firewall may be located between the mount server 106 and the central server 102, and/or between the mount server 106 and the user devices 104. Alternatively, if the backup repositories 108 are external and separate from the mount server 106, the firewall may be between the mount server 106 and the backup repositories 108.

The central server 102, the user devices 104, the mount server 106, and the backup repositories 108 may be managed by the different or the same entities. For example, the user devices 104, the mount server 106, and the backup repositories 108 may be managed by a specific entity an organization), and the central server 102 may be managed by a third party entity. As such, the user devices 104 may be entity-approved devices (e.g., the same entity managing the user devices 104, the mount server 106, and the backup repositories 108).

Accordingly, the central server 102. and/or the mount server 106 may determine the location of the requested data. For example, as illustrated in FIG. 1, where there is a single mount server 106 and multiple backup repositories 108, the central server 102 may send the request to the mount server 106 with an indication of the specific backup repositories 108 containing the requested data. Alternatively, the central server 102 can forward the request to the mount server 106 without such an indicating and only indicate the requested data. As such, the mount server 106 may determine the specific backup repositories 108 having such data.

Figure 2:
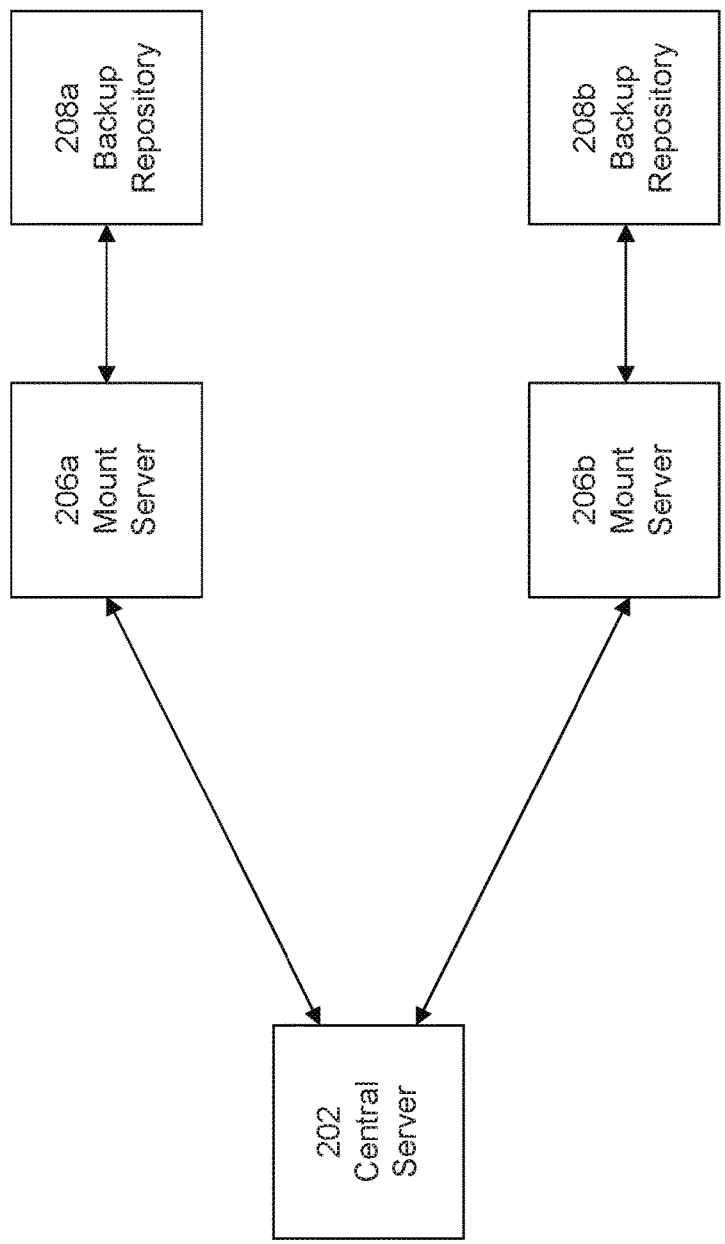
FIGS. 2 and 3 are example configurations of mount servers and backup repositories of the system of FIG. 1.
Figure 3:
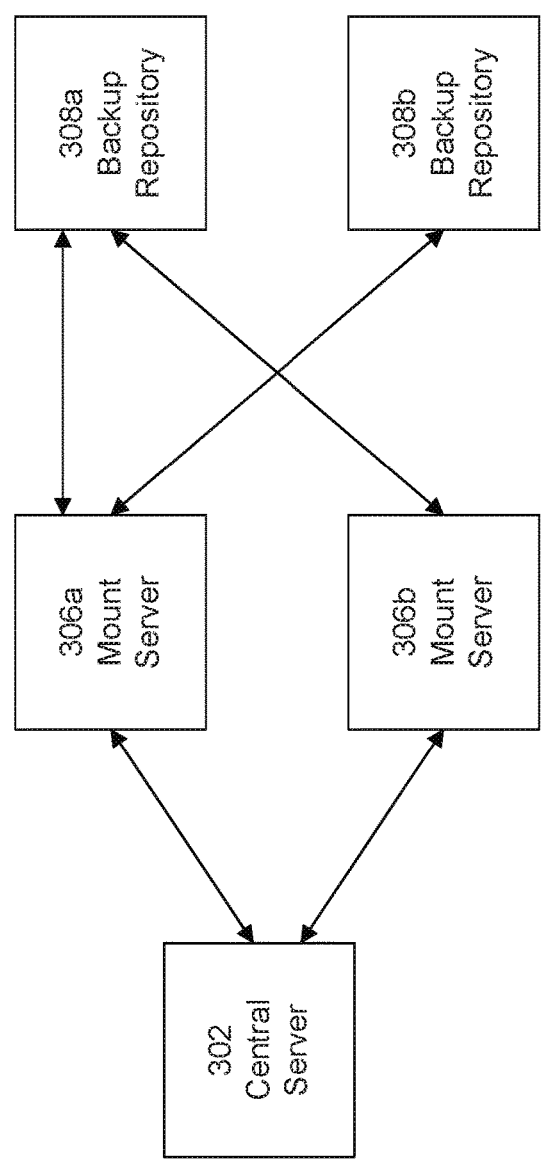

Referring now to FIGS. 2 and 3, the central server 202 and 302 may he in communication with a plurality of mount servers 206 and 306. The mount servers 206 and 306 may then be in communication with various backup repositories 208 and 308. Accordingly, as illustrated in FIG. 2, the mount servers 206a and 206b may only be in communication with their respective backup repositories 208a and 208b. Alternatively, as illustrated in FIG. 3, the mount servers 306 may also be in communication with each other's backup repository 308.

Along these lines, in FIGS. 2 and 3, the mount servers 206 and 306 may manage and/or store different portions and/or types of data. For example, the mount servers 206 and 306 may manage storage for different sectors of an organization, and the backup repositories 208 and 308 may store the different data for the respective sectors of the organization. Likewise, the mount servers 206 and 306 may manage storage for different time periods, and the backup repositories 208 and 308 may store the different data for the respective time periods.

Referring back to FIG. 1, the central server 102 may be in communication with the user devices 104 over a first communication line 110. The central server 102 may also be in communication with the mount server 106 over a second communication line 112. The mount server 106 may also be in communication with the backup repositories 108 over a third communication line 114. The mount server 106 may be in communication with the user devices 104 over a fourth communication line 116. The first communication line 110, the second communication line 112, the third communication line 114, and the fourth communication line 116 may be different or the same (e.g., private or public, wired or wireless, etc.). In some embodiments, the first communication line 110, the second communication line 112, and the third communication line 116 may be private communication lines. Along these lines, the first communication line 110, the second communication line 112, and the third communication line 116 may operate over a secure network provided b specific entity the same entity managing the user devices 104 and the mount server 106).

Accordingly, the user devices 104 can transmit a request to restore data to the central server 102. In some embodiments, the request may be manually initiated by a user of the user devices 104. The request may also be automatically initiated by the user devices 104 itself As such, the request may further be automatically initiated at various prescheduled times (e.g., hourly, daily, weekly, monthly, etc.).

Moreover, the request can indicate a point in time relating to the data. The point in time can be a specific time or a time frame. The specific time may include a particular date and/or time for receiving all data prior thereto. The time frame may include a start time and an end time for receiving all data therebetween.

As such, the point in time may be one of a plurality of backup copy intervals. The first backup copy interval can be an earliest point of time for performing a restore data and as will be discussed in more detail below, may enable a full restore. All subsequent intervals may relate to points in time after the first backup interval (i.e., the earliest of time) and as will be also discussed in more detail below, enable partial restores.

Upon receipt of the request, the central server 102 may manage communication with the mount server 106 for the user devices 104 to receive the portion of data, as will be discussed in more detail below. In doing so, the central server 102 may forward the request to the mount server 106. The mount server 106 may then analyze the data stored on the backup repositories 108. To analyze the data, the mount server 106 may receive the portion of data from the backup repositories 108. The mount server 106 may also analyze the portion of data by accessing the portion of data stored on the backup repository 108.

As such, in analyzing the portion of data, the mount server 106 may at least scan the portion of data to detect viruses. The viruses may be any type of malicious software intending to cause damage. Example viruses include a boot sector virus, a web scripting virus, a browser hijacker, a resident virus, a direct action virus, a polymorphic virus, a multipartite virus, an overwrite virus, a file injector virus, and a macro virus, to name just some examples. Other examples will be apparent to persons skilled in the relevant art(s).

To detect the viruses, the mount server 106 may include an antivirus engine, which may be installed by a user. The antivirus engine may be a module whose sole purpose is to find and/or remove viruses (e.g., in the form of code.) As such, mount server 106 may have an antivirus engine that finds and/or removes viruses. As discussed above, with respect to FIGS. 2 and 3, the central server 202 and 302 may be in communication with multiple mount servers 206 and 306. As such, each mount server 202 and 302 may have a different antivirus engine, which may be configured to find and/or remove different viruses.

Referring back to FIG. 1, the mount server 106's antivirus engine may be a third-party product. For instance, the antivirus engine may belong to the third party managing the central server 102. Alternatively, the antivirus engine may belong to third party different from that managing the central server 102. In either case, the antivirus engine may be different from the entity managing the user devices 104, the mount server 106, and the backup repositories 108.

Along these lines, the antivirus engine may be required to support a common-line interface. As such, the antivirus engine may be required to be accessible by commands in the form of successive lines of text (i.e., command lines). This may allow the mount server 106 to interact with the third party's antivirus engine.

Accordingly, the mount server 106 may have a configuration file that describes how the mount server 106 interact with the antivirus engine. The configuration file may be an Extensible Markup Language (XML) file. The configuration file may also be a third party file. As such, the third party managing the central server 102 may provide, and have access to, the configuration file.

The configuration file may contain an antivirus engine name, a command line parameters path, a registry path, a service name, a threat exists string pattern, a parallel scan configuration, a volume scan check, and/or an exit code. The antivirus engine name may be provided by the antivirus engine uploaded by the user.

The command line parameters path may provide arguments for launching a process for identifying viruses. As would be understood by a person of ordinary skill in the art, arguments may include any routine for identifying the virus, the registry path and the service name may provide the path and presence of the appropriate antivirus engine. The threat exists string pattern may provide an indication of the presence of computer viruses. As such, if the antivirus engines identify a pattern indicative of a computer virus, the threat exists string pattern may identify the pattern of the computer virus. The pattern may be unique to a particular computer virus. As such, the treat exists pattern may provide different patterns for different computer viruses. The exit code may output a result of the scan. For example, the exit code may indicate if the data does not contain viruses and/or if the if the data does contain viruses. As such, the exit codes may relate to an invalid line argument, an error in an antivirus scan, a cancellation of an antivirus scan (e.g., by a user or computer), a complete of an antivirus scan, a detection of a virus threat, and/or a failure to detect a virus threat. Moreover, the exit codes may be customizable based on the an virus engine's status messages and/or the user's preferred status messages. As such, if the antivirus engine prefers certain status messages, the exist codes may be based thereon. Likewise, if the user prefers certain status messages, the configuration file may be modified by the user via command line.

The parallel scan configuration and volume scan check may be optional features. As such, if the parallel scan configuration is activated, the mount server 106 may determine if the configuration file is able to perform multiple virus scans at the same time (e.g., using the same or different antivirus engines). Parallel scanning configuration may be utilized where antivirus engine are only utilized to detect certain viruses Alternatively, parallel scanning configuration may be utilized to analyze different files and/or volumes of files. Likewise, parallel scanning configuration may be utilized when the mount server 106 are handling requests for multiple user devices 102. As such, the parallel scanning configuration may increase the processing speed/time of the mount server 106.

Moreover, if the volume scan check is activated, the mount server 106 may determine if the virus scan is to be performed separately for multiple storage areas of the user device 104 (e.g., "C:" and "P:" drives). As such, different storage areas may be selected to be scanned by a user, and each storage area may contain multiple data files and/or different types of data.

In order to determine the presence of a virus, data may be transmitted from the from the backup repositories 108 to the mount server 106. Upon receipt, the mount server 107 may create a custom folder on the mount server 106 for storing the folder. The custom folder may contain symbolic links (e.g., short cuts) and/or direct paths to access each volume of the file of data separately. As such, the custom folder does not contain any duplicate data, rather pointers or links to storage areas containing specific data. This may allow the antivirus engine to scan select volumes and/or more quickly access the volumes, since data does not need to be duplicated.

Figure 4:
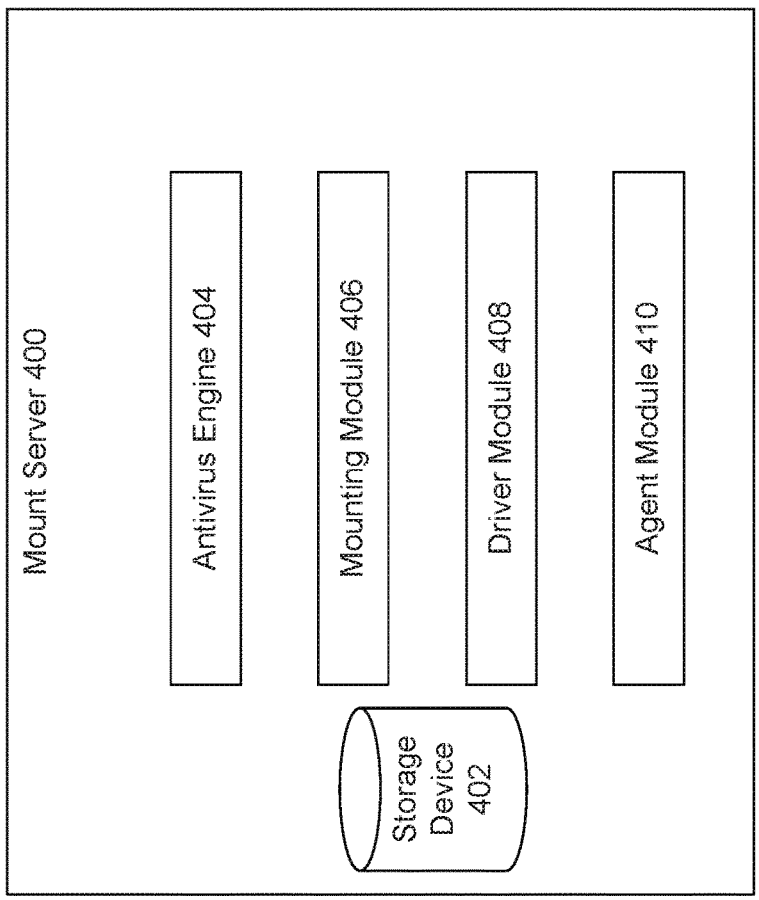
FIG. 4 is a block diagram of an example mount server of FIG. 1.

FIG. 4 illustrates an example mount server 400. The mount server 400 may include a storage device 402, an antivirus engine 404, a mounting module 406, a driver module 408, and an agent module 410. The storage device 102 may receive and store requests and/or may manage communication between other components of the mount server. The antivirus module 404 may contain an antivirus virus engine, as discussed above. The mounting module 406 may determine if a configuration file (e.g., XML File) specifying how the mount server 400 is to interact with the antivirus engine 404 is present on the mount server 400. If the configuration file is present, the mounting module 406 may then determine if the antivirus engine 404 are also present on the mount server 400. In some embodiments, only if the XML file and antivirus engine 404 are present on the mount server 400 may the restore process be initiated.

Upon initiation of the restore process, the agent module 410 may receive backup files containing the requested data from the backup repositories 108 (illustrated in FIG. 1) and then, forward the backup files to the driver module 408. The driver module 408 may thereafter mount volumes of the backup file onto a custom folder located on the storage device of the mount server 400. The custom folder may be utilized solely for storing files relating to the restore process. As such, as discussed above, the custom folder may create symbolic links to volumes of Subsequently, the driver module 408 and/or the agent module 410 may pull files from the folder (e.g., volumes of the files) and submit/pass it to the antivirus engine 404 to identify computer viruses.

Referring back to FIG. 1, the central server 102 may receive a request from the user devices 104 for a portion of data from the mount server 106 and/or backup repositories 108. The portion of data may relate to data existing at a specific point in time or during a specific period of time, as discussed above. As discussed above, the point in time may relate to a plurality of backup copy intervals, which may include a first backup copy interval corresponding to an earliest point of time for receiving data prior thereto and/or subsequent backup copy intervals following the first backup copy interval.

After receiving the request for the data, the central server 102 may send a request to the mount server 106 to retrieve and/or mount files containing the appropriate data from the backup repositories 108. Upon retrieving/mounting the files, the mount server 106 may initiate antivirus scans of the files. If the mount server 106 do not identify any viruses via the scans, the mount server 106 may send the requested data directly to the user devices 104 via the communication line 116. However, if the mount server 106 does identify viruses via the scans, the mount server 106 may determine an appropriate action to be taken.

In some embodiments, the mount server 106 may attempt to resolve (or remove) the virus (e,g., via the antivirus engine), If the mount server 106 are able to resolve/remove the virus, the mount sever 106 may continue the restoring process. However, if the mount server 106 are unable to resolve/remove the computer virus, the mount server 106 may determine if the restore process can be performed in a safe mode. For example, when the restore process relates to a virtual disk, the safe mode may not be permitted. Otherwise, the safe mode may be permitted. As such, to operate in safe mode, the mount server 108 may disconnect or disable itself and/or the user devices 104 from the network (e.g., via a network adapter) and perform the restore process with the file having the computer virus. This may prevent the mount server 106 network from being infected with the computer virus. In sonic embodiments, the mount server 106 may bypass the attempt to resolve (or remove) the virus and attempt to perform the restore process in the safe mode discussed above. In the aforementioned embodiments, the user may also presented to continue with the secure restore process with the presence of the virus.

Along these lines, when the mount server 106 detects the virus and does not attempt to resolve the virus or detects the virus and is unable to remove/resolve the virus, the mount server 106 may be permit the secure restore to networks and/or security groups different from the mount servers 108 network and security group. The networks/security groups may be isolated from the mount server 106 and any other user computer infrastructure. This may allow the user to perform the secure restore without sacrificing their computer infrastructure/network. The networks/security groups may be selected by a user (e.g., of the user devices 104 or of the entity managing the mount server 106). Example networks/security groups include Microsoft Azure and Amazon.

Moreover, when the mount server 106 are unable to resolve/remove computer viruses present on the files containing the requested data, the mount server 106 may determine different portions of data relating to different points in time or periods of time not containing computer viruses. The different points in time/periods of time may overlap so long as they contain different data. Along these lines, the different points in time/periods of time may be identified based on previous antivirus scans of the different points of time and periods of time or by performing subsequent antivirus scans for the different points of time and periods of time.

Further, the mount server 106 may permit its administrators to create tasks to check on the integrity or corruption of files stored on the backup repositories 108. The tasks can include a number of checks on various files stored on the backup repositories 108. This can allow administrators to resolve or remove viruses before the associated data is requested by the user devices 102.

Figure 5:
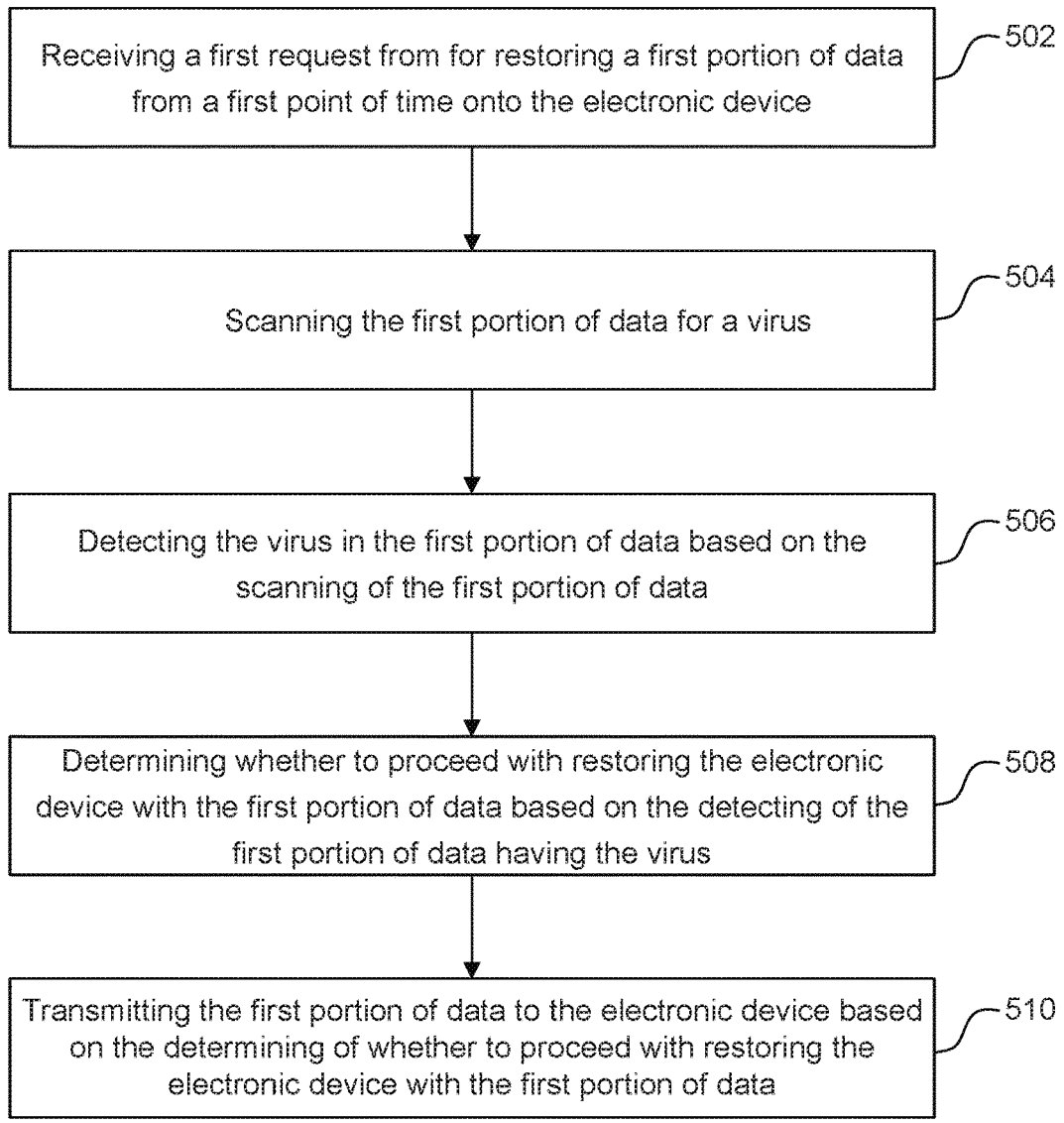
FIG. 5 is a flowchart illustrating a process for restoring data onto electronic devices of, for example, the system of FIG. 1, according to some embodiments.

FIG. 5 is a flowchart for a method 500 illustrating a process for restoring data onto electronic devices, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 1. However, method 500 is not limited to that example embodiment.

In 502, the mount server 106 receives a request from for restoring a portion of data from a first point of time onto the electronic device. The mount server 106 may receive the request from the central server 102, which receives it from the user devices 104. The first portion of data may be stored in a backup repository remote from the electronic device.

In 504, the mount server 106 scans the first portion of data for a virus. To do so, the mount server 106 may receive a file containing volumes of data from backup repositories 108. The mount server 106 may then initiate its antivirus engine to scan the volumes of data using command lines. As such, the antivirus engine may be third-party antivirus engine that support command line interfacing.

In 506, the mount server 106 detects the virus in the first portion of data based on the scanning of the first portion of data. The virus may be located in a particular volume of the file containing the data. As such, the mount server 106 may remove the volume such that the requested data is sent with the infected volume of data. Alternatively, the mount server 106 may attempt to resolve the virus. Along these lines, the mount server 106 determines if the restore process can be performed in a safe mode (e.g., by disconnecting from the mount server 106's network).

In 508, the mount server 106 determines whether to proceed with restoring the electronic device with the first portion of data based on the detecting of the first portion of data having the virus. For example, if the restore process relates to a virtual disk, the safe mode may not be permitted and thus, the restore process is terminated.

In 510, the mount server 106 transmits the first portion of data to the electronic device based on the determining of whether to proceed with restoring the electronic device with the first portion of data. For example, where safe mode is permitted, the requested data may be transmitted directly to the user devices 104 (e.g., without interference from the central server 102).

Figure 6:
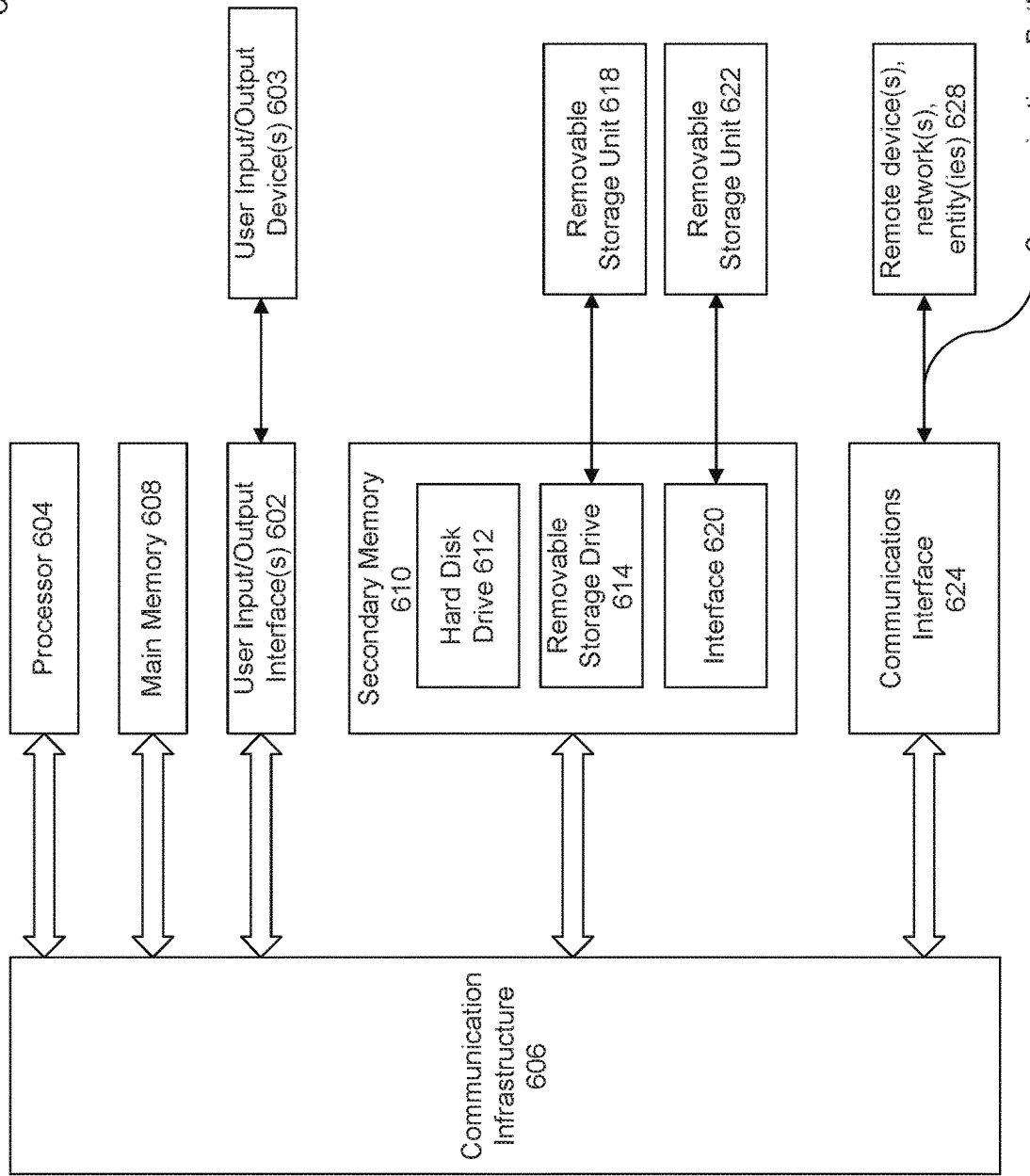
FIG. 6 illustrates an example computer system useful for implementing various embodiments.

Various embodiments and/or components therein can be implemented, for example, using one or more computer systems, such as computer system 600 shown in FIG. 6. Computer system 600 can be any computer or computing device capable of performing the functions described herein. For example, one or more computer systems 600 or portions thereof can be used to implement any embodiments of FIGS. 1-5, and/or any combination or sub-combination thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data. common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XML), Wireless Markup Language (WML) MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

What is claimed is:

1. A computer-implemented method for restoring an electronic device, comprising:
   receiving, at a mount server, a first request for restoring a first portion of data onto the electronic device, wherein the first portion of data is stored in a backup repository remote from the electronic device;
   in response to receiving the first request, creating, at the mount server, a custom folder comprising a pointer to a volume in the backup repository, wherein the volume comprises the first portion of data;
   scanning, at the mount server using the pointer to the volume, the first portion of data for a virus;
   detecting, at the mount server, the virus in the first portion of data based on the scanning of the first portion of data;
   determining, at the mount server, that the virus cannot be removed from the first portion of data in response to the detecting of the virus in the first portion of data;
   determining, at the mount server, whether to proceed with restoring the electronic device with the first portion of data based on the determining that the virus cannot be removed from the first portion of data; and
   transmitting, at the mount server, the first portion of data to the electronic device based on the determining of whether to proceed with restoring the electronic device with the first portion of data.

2. The computer-implemented method of claim 1, wherein the detecting of the virus is performed by an antivirus engine.

3. The computer-implemented method of claim 2, wherein the antivirus engine supports command line interactions.

4. The computer-implemented method of claim 3, wherein the detecting of the virus further comprises:
   analyzing a file comprising command lines defining command line interactions with the antivirus engine.

5. The computer-implemented method of claim 3, further comprising:
   receiving, at the mount server, a second request for restoring a second portion of data onto the electronic device based on the determining of whether to proceed with restoring the electronic device with the first portion of data, wherein the second request and the second portion of data are different from the first request and the first portion of data, respectively, and wherein the second portion of data is stored in a second backup repository remote from the electronic device;
scanning, at the mount server, the second portion of data for the virus;
detecting, at the mount server, the virus in the second portion of data;
determining, at the mount server, whether to proceed with restoring the electronic device with the second portion of data based on the detecting of the virus in the second portion of data; and
transmitting, at the mount server, the second portion of data for the restoring of the electronic device based on the determining of whether to proceed with restoring the electronic device with the second portion of data.

6. The computer-implemented method of claim 1, further comprising:
identifying a location of the virus in the first portion of data.

7. The computer-implemented method of claim 1, wherein the determining whether to proceed with restoring the electronic device with the first portion of data further comprises:
determining, at the mount server, that the electronic device can be restored in a safe mode; and
disabling, at the mount server, an adapter connecting the electronic device to a network comprising the electronic device and a server based on the determining that the electronic device can be restored in the safe mode,
wherein the disabling of the adapter is performed prior to the transmitting of the first portion of data to the electronic device.

8. The computer-implemented method of claim 7, wherein the determining that the electronic device can be restored in the safe mode further comprises:
determining that restoring the electronic device with the first portion of data is associated with a virtual disk.

9. The computer-implemented method of claim 1, further comprising:
checking the first portion of data for the virus,
wherein the checking is performed prior to the receiving of the first request, and
wherein the checking is performed by an administrator of the electronic device and the first request is received from a user of the electronic device.

10. The computer-implemented method of claim 1, wherein the electronic device is a physical computer.

11. The computer-implemented method of claim 1, wherein the electronic device is a virtual computer.

12. The computer-implemented method of claim 1, wherein the transmitting further comprises:
transmitting the first portion of data to the electronic device based on the electronic device being on a different network than the mount server or the electronic device being associated with a different security group than the mount server.

13. A system, comprising:
a memory; and
at least one processor coupled to the memory and configured to:

receive a first request for restoring a first portion of data onto an electronic device, wherein the first portion of data is stored in a backup repository remote from the electronic device;
in response to receiving the first request, create a custom folder comprising a pointer to a volume in the backup repository, wherein the volume comprises the first portion of data;
scan, using the pointer to the volume, the first portion of data for a virus;
detect the virus in the first portion of data;
determine that the virus cannot be removed from the first portion of data in response to the detection of the virus in the first portion of data;
determine whether to proceed with restoring the electronic device with the first portion of data based on the determination that the virus cannot be removed from the first portion of data; and
transmit the first portion of data to the electronic device based on the determination of whether to proceed with restoring the electronic device with the first portion of data.

14. The system of claim 13, wherein to detect the virus in the first portion of data, the at least one processor is configured to detect the virus using an antivirus engine supporting command line interactions.

15. The system of claim 13, wherein to detect the virus in the first portion of data, the at least one processor is configured to:
run a file comprising command lines defining command line interactions between the electronic device and the antivirus engine.

16. The system of claim 13, wherein the at least one processor is further configured to:
receive a second request for restoring a second portion of data onto the electronic device based on the determination of whether to proceed with restoring the electronic device with the first portion of data, wherein the second request and the second portion of data are different from the first request and the first portion of data, respectively, and wherein the second portion of data is stored in a second backup repository remote from the electronic device;
scan the second portion of data for the virus;
detect the virus in the second portion of data;
determine whether to proceed with restoring the electronic device with the second portion of data based on the detection of the virus in the second portion of data; and
transmit the second portion of data for the restoring of the electronic device based on the determination of whether to proceed with restoring the electronic device with the second portion of data.

17. The system of claim 13, wherein to determine whether to proceed with restoring the electronic device with the first portion of data, the at least one processor is further configured to:
determine that the electronic device can be restored in a safe mode; and
disable an adapter connecting the electronic device to a network comprising the electronic device and a server based on the determination that the electronic device can be restored in the safe mode, wherein the disabling is performed prior to the first portion of data being transmitted to the electronic device.

18. A non-transitory computer-readable medium having instructions stored thereon that, when executed by at least one computing device, cause the at least one computing device to perform operations comprising:

receiving a first request for restoring a first portion of data onto an electronic device, wherein the first portion of data is stored in a backup repository remote from the electronic device;

in response to receiving the first request, creating a custom folder comprising a pointer to a volume in the backup repository, wherein the volume comprises the first portion of data;

scanning, using the pointer to the volume, the first portion of data for a virus;

detecting, by the at least one processor, the virus in the first portion of data;

determining that the virus cannot be removed from the first portion of data in response to the detecting of the virus in the first portion of data;

determining whether to proceed with restoring the electronic device with the first portion of data based on the determining that the virus cannot be removed from the first portion of data; and transmitting the first portion of data to the electronic device based on the determining of whether to proceed with restoring the electronic device with the first portion of data.

19. The non-transitory computer-readable medium of claim 18, the operations further comprising:

receiving a second request for restoring a second portion of data onto the electronic device based on the determining of whether to proceed with restoring the electronic device with the first portion of data, wherein the second request and the second portion of data are different from the first request and the first portion of data, respectively, and wherein the second portion of data is stored in a second backup repository remote from the electronic device;

scanning the second portion of data for the virus;

detecting the virus in the second portion of data;

determining whether to proceed with restoring the electronic device with the second portion of data based on the detecting of the virus in the second portion of data; and transmitting the second portion of data for the restoring of the electronic device based on the determining of whether to proceed with restoring the electronic device with the second portion of data.

20. The non-transitory computer-readable medium of claim 18, wherein the determining whether to proceed with restoring the electronic device with the first portion of data further comprises:

determining that the electronic device can be restored in a safe mode; and disabling an adapter connecting the electronic device to a network comprising the electronic device and a server based on the determining that the electronic device can be restored in the safe mode, wherein the disabling is performed prior to the first portion of data being transmitted to the electronic device.

* * * * *